N. Y. MOMITSA.
MACHINE FOR REMOVING CORES FROM PNEUMATIC TIRE CASINGS.
APPLICATION FILED NOV. 1, 1920.
1,386,644. Patented Aug. 9, 1921.
5 SHEETS—SHEET 1.
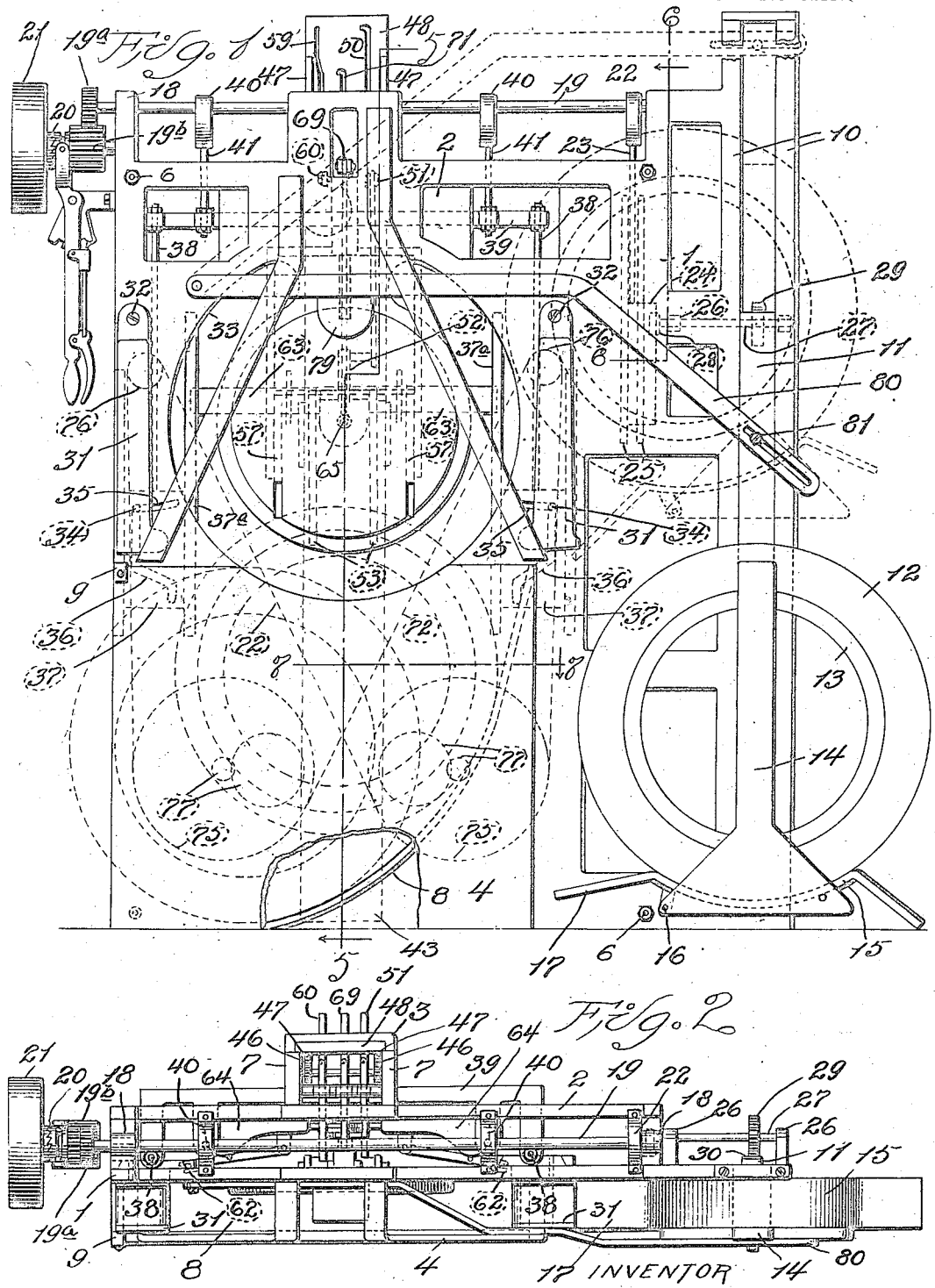
INVENTOR
NICHOLA YOSIFF MOMITSA,
by Ralph Kalish ATTORNEY.

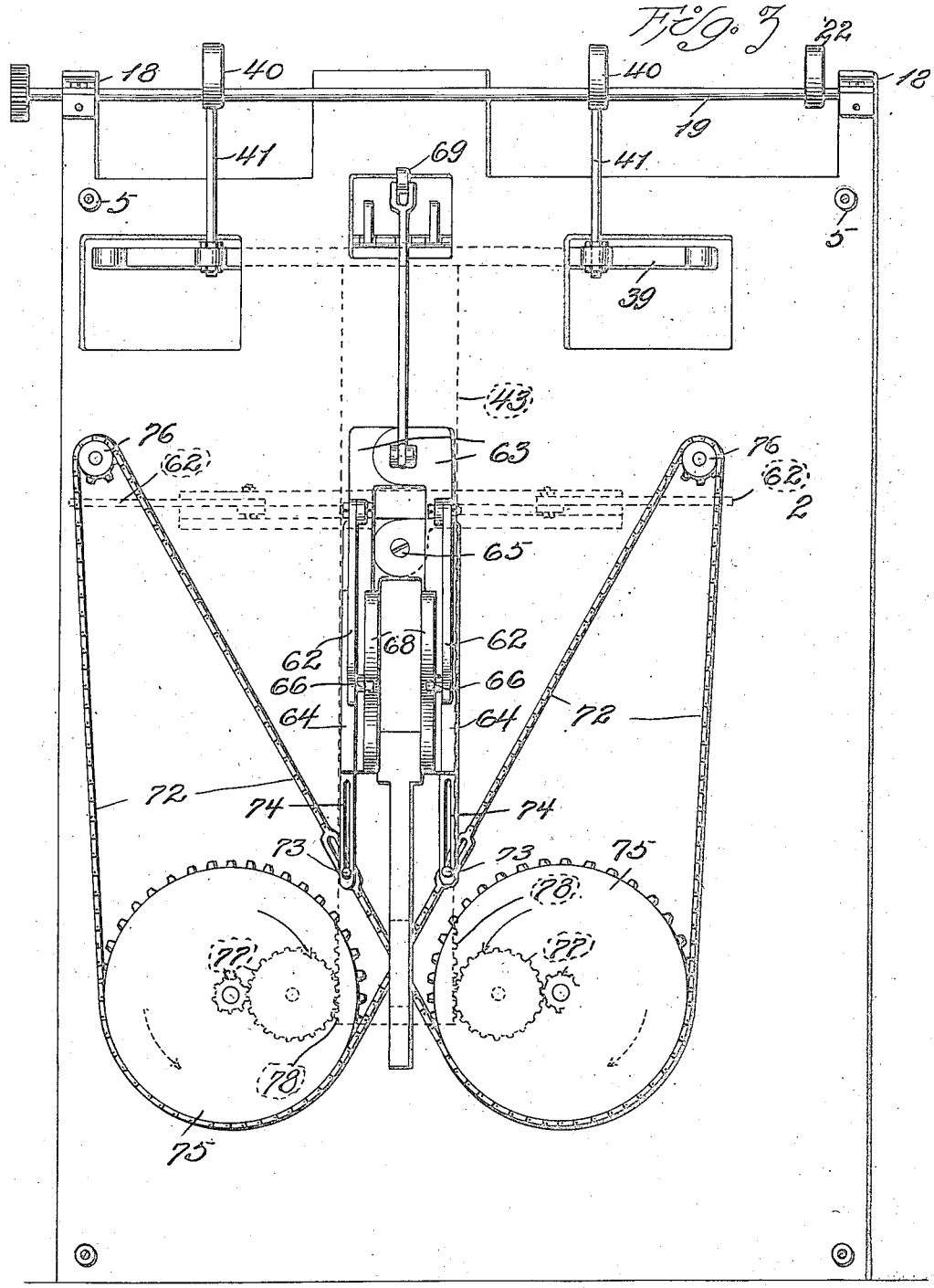

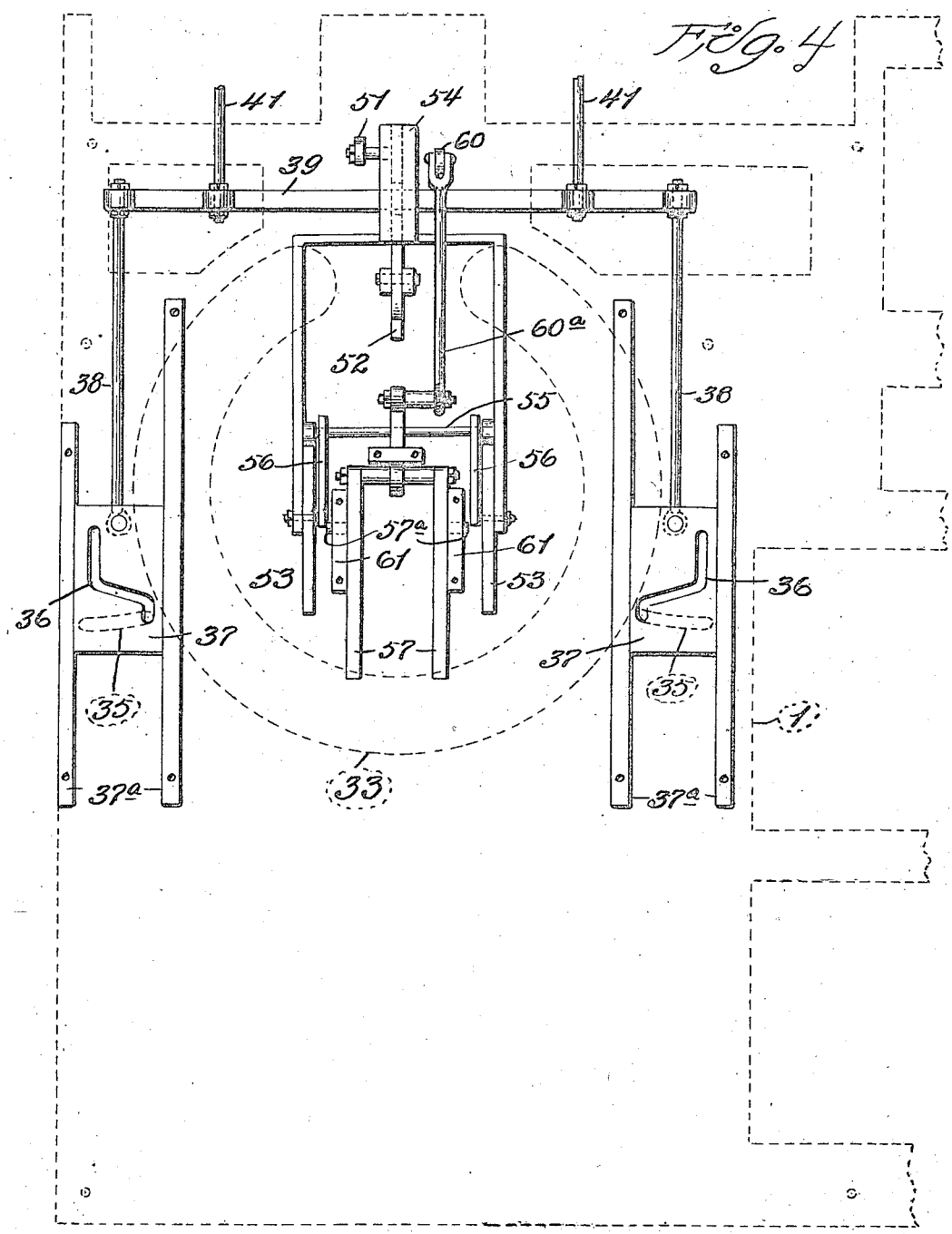

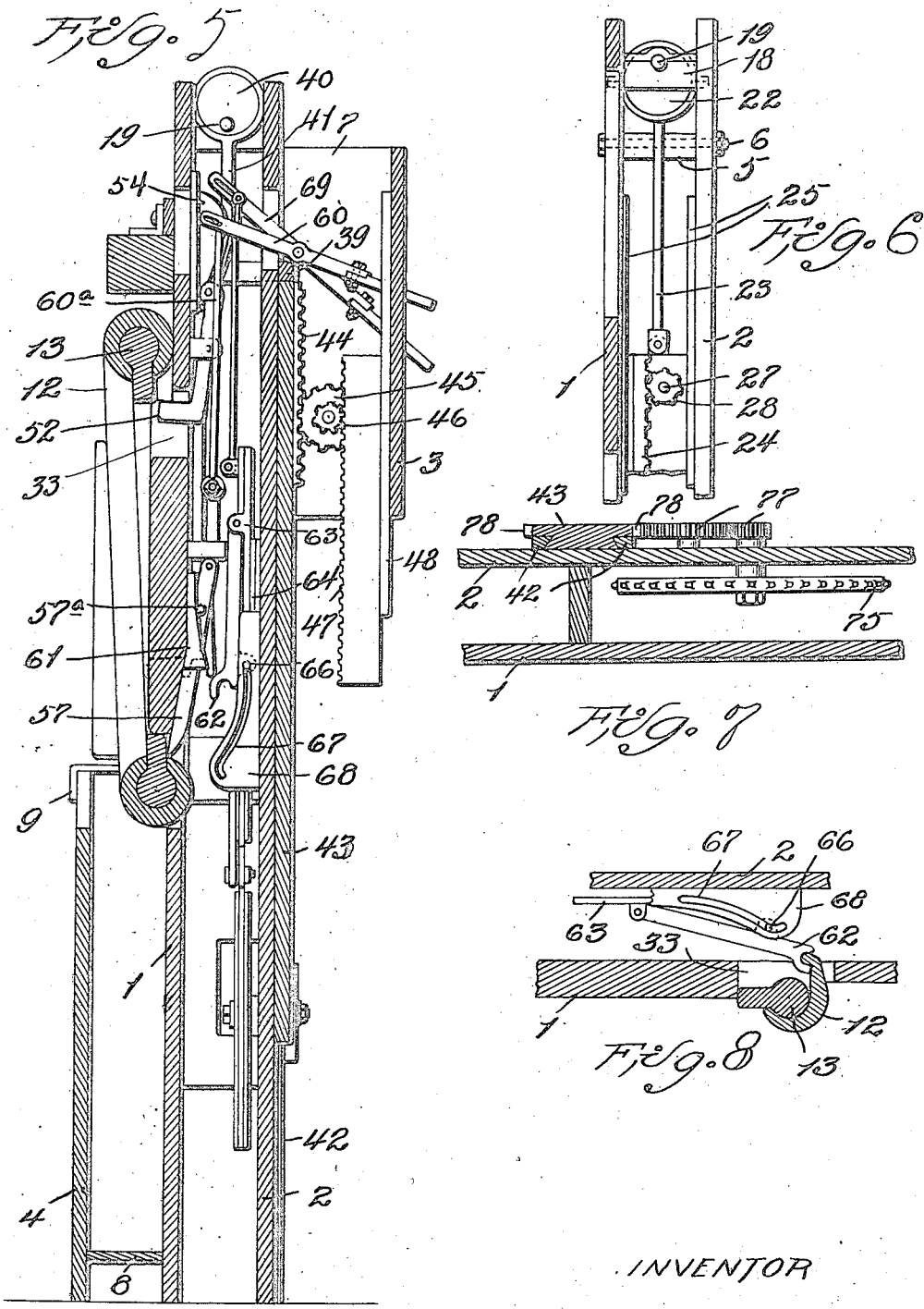

N. Y. MOMIISA.
MACHINE FOR REMOVING CORES FROM PNEUMATIC TIRE CASINGS.
APPLICATION FILED NOV. 1, 1920.
1,386,644.
Patented Aug. 9, 1921.
5 SHEETS—SHEET 5.
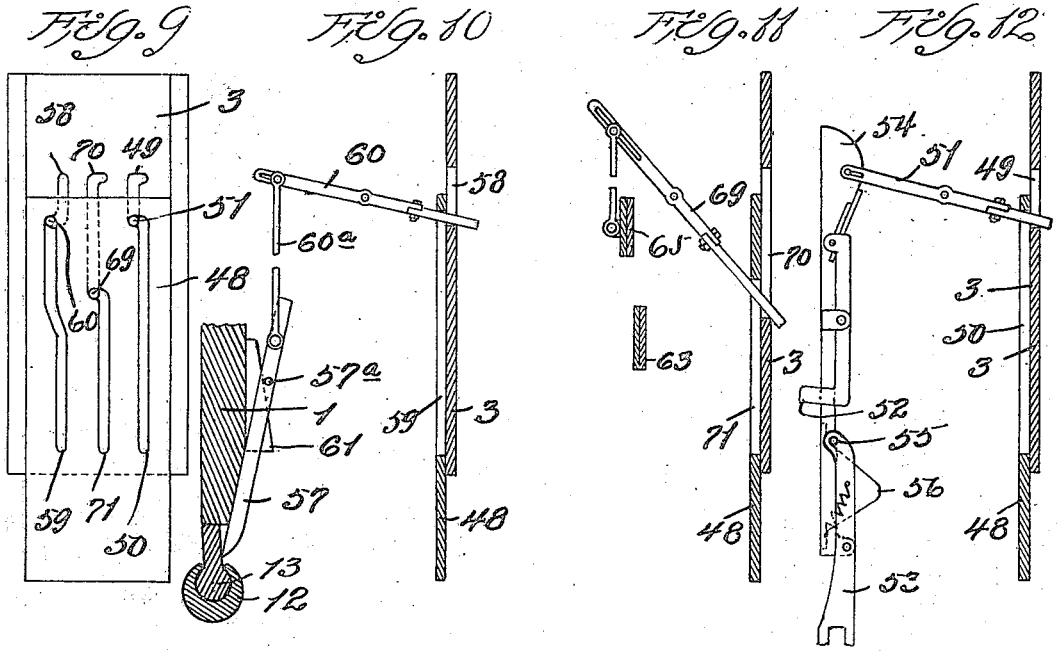
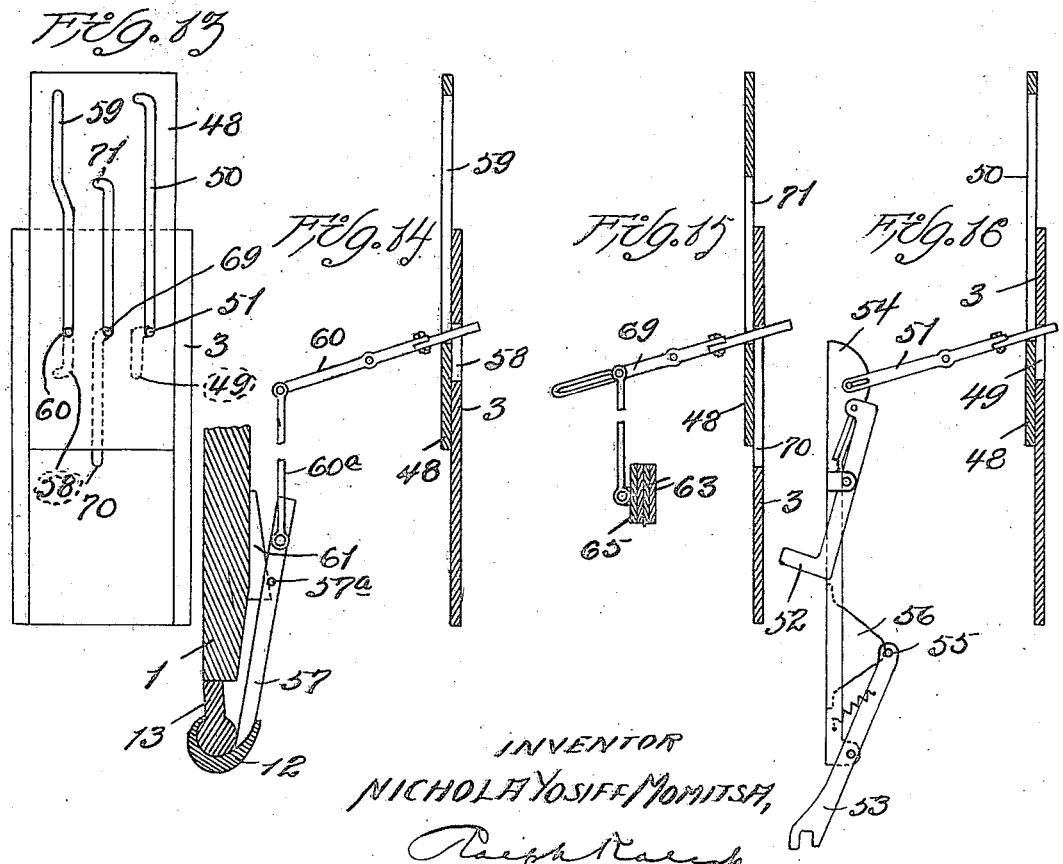
INVENTOR
NICHOLA YOSIFF MOMIISA,
by Ralph Kaech
ATTORNEY.

UNITED STATES PATENT OFFICE.

NICHOLA YOSIFF MOMITSA, OF CRESTLINE, OHIO.

MACHINE FOR REMOVING CORES FROM PNEUMATIC-TIRE CASINGS.

1,386,644. Specification of Letters Patent. Patented Aug. 9, 1921.

Application filed November 1, 1920. Serial No. 421,057.

*To all whom it may concern:*

Be it known that I, NICHOLA YOSIFF MOMITSA, a subject of Macedonia, residing at the city of Crestline, State of Ohio, have invented certain new and useful Improvements in Machines for Removing Cores from Pneumatic-Tire Casings, of which the following is a specification, reference being had to the accompanying drawings, forming a part thereof.

This invention relates generally to the manufacture of pneumatic tire-casings and, more particularly, to certain new and useful improvements in machines for removing the cores from casings of pneumatic tires, the principal objects of my present invention being to provide a compact, practical, and efficient machine that is capable of convenient and economical operation and which will rapidly, effectively, and automatically perform the operations necessary in the removal of cores from pneumatic tire casings after the latter have been molded and vulcanized.

In ordinary practice, so far as I am aware, the operations incident to the removal of the cores from pneumatic tire casings are performed by hand, and such operations cannot be conveniently or rapidly performed due to the fact that both the metallic core and the casing positioned thereupon are in a highly heated condition. It is the purpose of my invention to provide an organized mechanism for the handling of the newly formed tire casings and the removal of the cores upon which said casings are formed, said machine being designed to very rapidly and efficiently automatically perform the core-removing operations, thereby materially decreasing the labor and expense involved in particularly those operations incident to the removal of the cores and consequently materially reducing the cost of production of the casings.

Further objects of my invention are to provide relatively simple and convenient means for handling the casings and the cores contained therein, to provide efficient tools for engaging and removing or stripping the casings from the cores, and, further, to provide a simple mechanism for bringing about the operation of the casing-removing tools in proper sequence and in proper time relation to each other.

With the foregoing and other objects in view, my invention resides in the novel features of form, construction, arrangement, and combination of parts hereinafter described and afterward pointed out in the claims.

In the accompanying drawings,—

Figure 1 is a front elevational view of a machine constructed in accordance with my invention and embodying my improvements, with portions of the front-plate of the casing-discharge chute and of the elevator frame-work broken away, showing, by dotted lines, the elevator with a casing in raised or feeding position and a casing at different positions in its travel through the machine;

Fig. 2 is a plan view of the machine;

Fig. 3 is a front elevational view of the rear frame-plate of the machine, showing the means employed for effecting the final stripping of the casing from the core, and likewise showing the connections between such stripping means and the main driving shaft of the machine;

Fig. 4 is an elevational view of the parts carried upon the front frame-plate of the machine, the latter being shown in dotted lines, and also showing the means employed for shifting the temporary support for the casing, the core support and holding means, and the initial stripping means;

Fig. 5 is a vertical sectional view of the machine taken approximately on the line 5—5, Fig. 1;

Fig. 6 is a detail sectional view taken approximately on the line 6—6, Fig. 1, showing the rack and pinion that is utilized for operating the elevator from the main driving shaft;

Fig. 7 is a horizontal sectional view taken approximately on the line 7—7, Fig. 1, showing the rack, pinion, and sprocket gearing that is utilized for actuating the final stripping means;

Fig. 8 is a diagrammatic sectional view of the machine, showing the final stripping means in its elevated position;

Fig. 9 is a diagrammatic elevational view of the means, shown in elevated position, utilized for timing the casing-holding and stripping means;

Fig. 10 is a diagrammatic sectional view showing parts of the initial stripping means in elevated positions;

Fig. 11 is a view similar to Fig. 10, showing the final stripping devices in elevated position;

Fig. 12 is a diagrammatic sectional view, showing the core-holding devices in their elevated or released or non-holding position;

Fig. 13 is a view similar to Fig. 9, showing the timing means in its lowered position;

Fig. 14 is a view similar to Fig. 10, showing the initial stripping means in its active or operating position;

Fig. 15 is a view similar to Fig. 11, showing parts of the final stripping means in operating position; and Fig. 16 is a view similar to Fig. 12, showing the core-holding devices in their lowered or casing and core engaging position.

Referring now by numerals to the accompanying drawings, which illustrate a practical embodiment of my invention, 1 designates a vertically disposed plate that forms the front wall or frame of the machine, 2 the rear frame-plate, 3 the stationary plate of the timing-mechanism, and 4 the front plate or wall of the chute through which the casings discharge after the cores have been removed therefrom.

Plates 1 and 2 are framed together and held in spaced relation by means of sleeves 5 through which pass bolts 6; and plate 3 is fixed in spaced position to the rear of plate 2 by side plates or walls 7. Plate 4 is connected to plate 1 and held in spaced relation in front of the latter by means of a curved chute bottom 8 and transverse strips, such as 9.

At the right-hand side of plate 1, as best seen in Fig. 1, a pair of vertically disposed parallel rails 10 provide a vertically disposed way through which is adapted to move vertically the rear member or rail 11 of an elevator that is adapted to receive and hold annular casings, such as 12, and within each of which casings is positioned the usual core or, and preferably, as here shown, a one-piece ring-shaped core, such as 13. This elevator includes a vertically disposed front member or wall 14 and a curved bottom member 15, the latter being pivotally connected, as at 16, to part or wall 14 and the left-hand end of the bottom member 15 being provided with a dumping-arm 17. This elevator is utilized for successively moving or lifting the casings with their cores from a position adjacent to the floor or ground line to an elevated position, which latter is in a plane slightly above that occupied by the casing holding and stripping devices shortly to be described.

Journaled for rotation in suitable bearings 18 adjacent to the tops of plates 1 and 2, is a horizontally disposed main shaft 19, one end of which carries a pinion 19ᵃ that meshes with a companion pinion 19ᵇ, the latter having a clutch-connection 20 with a suitably driven pulley or belt-wheel 21.

Mounted on shaft 19, near its right-hand end, is an eccentric 22, and coöperating therewith is a strap and link connection 23, the lower end of the latter being pivotally connected to a rack 24, which is mounted for vertical reciprocation between suitable guideways 25 arranged on the adjacent plates 1 and 2.

Extending rearwardly from plate 1 to the sides of the vertically disposed guide-rails 10, are bearings 26, in which is journaled a shaft 27, and mounted on shaft 27 is a pinion 28 that meshes with the teeth of rack 24. Shaft 27 also carries a toothed wheel or pinion 29 that meshes with a rack 30 secured to rear member 11 of the elevator.

By virtue of the construction just described, the casing-elevator comprising the parts 11, 14 and 15 will be raised and lowered as the shaft 19 is rotated, for, following the rotation of this shaft, eccentric 22 will, through its strap and link connections 23, impart vertical reciprocating movement to rack 24, and through the gear wheels 28 and 29, shaft 27, and rack 30, this vertical reciprocating movement will be imparted to the elevator.

In the operation incident to the raising or elevating of a casing and its core, the casing is suitably positioned upon the curved base-member 15 between the parts 11 and 14, and at the proper time in the operation of the machine the elevator and the casing carried thereby will be automatically elevated to the position shown by dotted lines in Fig. 1, and from its position on the elevator said casing will be dumped or discharged toward the left-hand and into that portion of the machine in which the stripping means is located, such discharge being automatically accomplished by the engagement of the dumping or dropping arm 17 with a stop arranged in the machine, which action tilts the bottom-member 15 of the elevator and effects a rolling discharge of the carried casing with its inclosed core.

The stop just referred to, and with which arm 17 engages, is formed by one of a pair of combined guides and supports 31 whose "backs" are pivotally connected by bolts 32 to the front of plate 1, said combined guides and supports being disposed upon opposite sides of a substantially circular opening 33 that is formed in the front frame-plate 1, as seen best in Fig. 1.

In Fig. 1, these guides and supports 31 are shown in spread-apart of non-supporting positions, but when they are both swung inwardly toward each other, they occupy coöperating positions to support a casing with its core, when the same is discharged from the elevator, in a position substantially concentric with the opening 33. The means for swinging the supports 31 from one position to another comprises, for each support, a pin 34 projecting rearwardly from the body of the support through an arcuate slot 35 in frame-plate 1 and into a substantially L-shaped slot 36 that is formed in a slide-block 37 mounted for vertical movement between ways 37ª fixed upon the frame-plate 1. The slots 36, as best seen in Fig. 4, are shaped so as to cause the pins 34 to move toward each other when the blocks 37 are moved to their lower limits of movement, and when so positioned the members 31 are in position to support a casing and its core, and to move the pins 34 away from each other to actuate the supports 31 to non-supporting casing positions when the blocks 37 are at their upper limits of movement. The blocks 37 are slidably actuated by means of rods 38 connected to a yoke 39, which is adapted for vertical reciprocation by eccentrics 40, the latter being secured to the main shaft 19 and having engagement through strap and link connections 41 with the yoke 39.

Suitably connected to yoke 39 and mounted for movement in slide-ways 42 on the rear face of frame-plate 2, is a slide-plate 43 provided near its upper end with a rack 44. Meshing with the teeth of the rack 44, is a gearwheel 45 journaled on a stub-shaft that projects from the adjacent frame side-member 7, and carried by gearwheel 45, is a pinion 46 that meshes with and reciprocates a rack 47 fixed to a time-plate 48 arranged for sliding movement on back-plate 3.

By referring to Figs. 9, 12, 13, and 16, it will be noted that plate 3, which is fixed or stationary, is provided with a short vertically disposed slot 49 which coöperates with an elongated slot 50 in timing-plate 48, and extending through the registering portions of said slots 49 and 50 is an arm 51 suitably fulcrumed upon the frame of the machine, which arm 51 is adapted for actuating the holding means for the core and casing during that portion of the operation in which the casing is stripped from the core.

This core-holding means comprises a pivotally mounted hook 52, the lower portion of which is adapted for projection and withdrawal through a suitably formed opening in frame-plate 1, so as to engage and suspend the core of a casing that is supported by supporting members 31.

In order that the core may be held against any movement while the casing is being stripped therefrom, I provide suitable preferably bifurcated or forked core-clamps 53 which are adapted to engage the inner perimeter of the core opposite to, and while engaged by, the hook 52.

The hook 52 is rocked to operative and inoperative, or to core-engaging and core-releasing, positions by means of a cam-block 54 that is connected with the rocking arm 51. The core-clamps 53 are pivotally connected to the cam-block 54 to move therewith relatively to the frame of the machine and also carry pins 55, which latter are adapted to ride over cams 56 on the block 54 to swing the lower ends of the clamps 53 outwardly through the frame plate and thus engage and clamp the core while suspended from hook 52, the operations of the hook 52 and clamps 53 being best illustrated in Figs. 12 and 16.

With the casing and its core thus held, the succeeding step is to partially free or strip the casing from the core, which operation is accomplished directly by means of a pair of connected substantially parallel chisel-pointed tools 57. (See Figs. 10 and 14.) The means provided for actuating these tools 57 includes a slot 58 in fixed plate 3, a coöperating slot 59 in the movable timing-plate 48, and a lever 60, also suitably fulcrumed upon the machine, one end of which lever 60 passes through the coöperating slots 58 and 59 and is suitably connected by links 60ª with the tools 57, each tool 57 being provided with a pin or shoulder 57ª that is adapted to ride over a fixed cam-block 61. When the timing-plate 48 moves upwardly, lever 60 will be actuated to correspondingly move the tools 57 downwardly into engagement with the core and casing, as seen in Fig. 1. As the tools 57 continue to move downwardly, their pins 57ª ride over or upon the cam-block 61 and give the tools 57 somewhat of an oblique position relatively to the core and casing, as seen in Fig. 14, one margin of the casing being thereby forced or spread away from the core, ready for convenient gripping and further stripping now to be described.

The next operation or final stripping of the casing from the core is accomplished by means of a pair of stripping-tools 62 that are pivotally carried on swinging arms 63 supported in guides 64, which latter are pivoted to frame plate 2 on a pulley 65 in such a manner that their lower ends may be swung laterally and carry the arms 63 with the stripping tools 62 into engagement with one edge of the partially freed casing and strip the same from the core. (See Fig. 8.) As seen particularly in Figs. 5 and 8, each of the tools 62 is so forked or shaped at its working end as to efficiently grip or engage the casing as shown without tearing or damaging the same.

Each of the tools 62 is provided with a pin 66, which is adapted to travel through a cam-slot 67 that is formed in a block 68 carried by each guide 64, each slot 67 being formed or shaped so that the tool 62, when moved downwardly, will be projected forwardly to engage effectively one edge or margin of the partially freed casing.

The movement of the tool-carrying arms 63 longitudinally or lengthwise of their supporting guides 64 is synchronized with other operations of the machine by the timing-plate 48, as clearly illustrated in Figs. 3, 5, 8, 11, and 15, such movement being accomplished by means including a rocking lever 69 similar to levers 51 and 60, a slot 70 in plate 3, and a coöperating slot 71 in timing-plate 48, one end of the lever 69 passing through the coöperating slots 70 and 71. When plate 48 is elevated, lever 69 will move arms 63 with the stripping tools 62 to positions forwardly of the frame-plate 1, in which position the tools 62 will be directed into engagement with and hook the partially freed casing. With the tools 62 thus hooked over or upon the casing, guides 64 are swung outwardly away from each other to the positions shown by dotted lines in Fig. 3. This swinging of the guides 64 is accomplished by means of a sprocket gear, which includes a sprocket-chain 72 connected to guides 64 by means of pins 73, the latter passing through slots in plates 74 that perform the functions of links in the sprocket-chains. Chain 73 passes around and engages with relatively large sprocket wheels 75 and idler sprocket wheels 76. The rotation of sprocket wheels 75 is accomplished through meshing pinions 77, the larger members of which engage the teeth of racks 78 carried by slide-plate 43. When sprocket wheels 75 are rotated toward each other, as illustrated in Fig. 3, chains 72 will act to swing the guides 64 outwardly, thereby through the tools 62, gradually and without tearing stripping the casing from its core; when the wheels 75 are rotated in the opposite direction, the chain 75 will move or return the guides 64 to their original positions.

Inasmuch as the stripping tools 62 do not traverse the entire circumference of the core and casing, I provide means for forcing the core from the casing when the casing has been so partially stripped from the core by the tools 62, such means including a press or core-ejector in the form preferably of a block 79 that is carried on an arm 80 pivoted at one end to frame-plate 1, arm 80 having a slot-and-pin connection 81 at its opposite end with the casing-and-core-elevator, as illustrated in Fig. 1.

The operation of my core-stripping mechanism may, in addition to the foregoing description, be described as follows:

When the elevator is at its lowermost limit of movement and in position to easily by hand or otherwise receive a casing and its core, all of the eccentrics 22 and 40 carried by shaft 19 are "down" or at the lowermost points in their paths of travel about the axis of said shaft, and as a result the supports 31 are spread apart to inactive positions and the ejector 79 is in position to engage and press a core to discharge it finally from a casing and from the machine. At such time and with the said parts so positioned, tools 57 are in extended position and the stripping-tools 62 are in their final or full-stroke positions. As shaft 19 is rotated to raise the elevator as hereinbefore described, the eccentrics 40 are actuated to raise yoke 39, thereby causing the supports 31 to swing inwardly to positions to receive and support the casing and its core, as the same are discharged from the elevator, centrally relatively to the stripping devices. As yoke 39 is elevated, slide plate 43 will be moved upwardly, and by means of the meshing gearwheels 77 and racks 78, the sprocket-chain 72, operating on sprocket wheels 75, will be actuated and the guides carrying the arms 63 and tools 62, will in turn be moved to their starting positions, as shown in full lines in Fig. 3. The upward movement of the slide-plate 43 causes timing-plate 48, through rack 44 and meshing gears 45 and 46, to be moved downwardly, and in so moving or sliding downwardly plate 48, as shown in Figs. 10, 11, and 12, through rocking-levers 51, 60, and 69, moves the core-hook 52, core-clamps 53, tools 57, and strippers 62 to inactive positions. As shaft 19 continues to rotate the eccentrics 22 and 40 carried thereby are all moved in a downward direction relatively to the frame of the axis of said shaft, and in such movement the timing-plate 48 is moved upwardly and the elevator downwardly to receive the succeeding casing.

The relative lengths of the several coöperating slots in the plate 3 and movable plate 48 are such as to bring about proper synchronized operation of the rocking-levers 51, 60, and 69, the core hook and clamp, the initial stripper, and the final stripper being consequently caused to act in proper sequence and in proper time relation to each other.

The timing device or plate 48, on its upward movement, acts first to move the core-hook 52 and clamps 53 to functioning positions to grip and hold the casing and core, then acts to move the tools 57 to engage the casing to begin to free the casing from the core, and finally acts to move the arms 63 and tools 62 to extended positions to engage the partially freed casing. The core being so held and the casing being so engaged, the continued rotation of the eccentrics moves the sprocket chain 72 so as to swing or spread the stripping-tools 62 outwardly to strip the casing from the core; immediately thereafter the ejector 79 presses the core entirely from the so freed casing, and then as supports 31 move outwardly, the casing drops downwardly into and through the discharge chute 8.

A casing-stripping machine of my construction is relatively simple, requires no attention on the part of an operator other than the feeding of casings onto the elevator, can be operated with comparatively little power, and is very effective in rapidly, efficiently, and automatically stripping pneumatic tire casings from the cores upon which they are formed and vulcanized.

It will be readily understood that changes in the size, form, construction, arrangement, and combination of the various parts of my core-removing machine may be made and substituted for those herein shown and described without departing from the nature and spirit of my invention.

Having thus described my invention, what I claim and desire to secure by Letters Patent is:

1. A machine for removing cores from tire-casings including, in combination, means for holding a core with a casing thereon, means for delivering cores with casings thereupon to the holding means, and means for automatically separating the casing from the core.

2. A machine for removing cores from tire-casings including, in combination, means for holding a core with a casing thereon, means for partially freeing the casing from the core, means for stripping the partially freed casing from the core, and means for delivering cores with casings thereupon to said holding means.

3. A machine for removing cores from tire-casings including, in combination, means for holding a core with a casing thereon, means for partially freeing the casing from the core, means for stripping the partially freed casing from the core, means for delivering cores with casings thereupon to said holding means, and means for causing the delivering means, holding means, and stripping means to operate in proper time relation to each other.

4. A machine for removing cores from tire-casings including, in combination, means for holding a core with a casing thereon, means for partially freeing the casing from the core, means for stripping the partially freed casing from the core, means for delivering cores with casings thereupon to said holding means, and means for automatically actuating the delivering means, holding means, and stripping means in proper sequence.

5. A machine for removing cores from tire casings including, in combination, a casing elevator, supporting means adapted to receive the casing with its core from the elevator, means for holding the casing and its core, and means for partially stripping the casing from the core while the same is retained by the holding means.

6. A machine for removing cores from tire-casings including, in combination, a casing elevator, supporting means adapted to receive the casing with its core from the elevator, means for holding the casing and its core, means for partially stripping the casing from the core while the same is retained by the holding means, and means for removing the core from the partially stripped casing.

7. A machine for removing cores from tire-casings including, in combination, a casing elevator, supporting means adapted to receive the casing from the elevator, means for holding the casing and its core, means for partially stripping the casing from the core while the same is retained by said holding means, means for removing the core from the partially stripped casing, and means for discharging the separated casing and core.

8. A machine for removing cores from the tire-casings including, in combination, a casing elevator, supporting means adapted to receive the casing from the elevator, means for holding the casing and its core, means for partially stripping the casing from the core while the same is retained by the holding means, means for removing the core from the partially stripped casing, means for discharging the separated casing and core, and means for synchronously effecting and controlling the operations of the casing elevator, holding, stripping, and discharging means.

9. A machine for removing cores from tire-casings including, in combination, a delivering elevator, means for receiving the casings with their cores as delivered from the elevator, means for clamping the cores, means for partially freeing the casings from the clamped cores, means for stripping the freed casings from the cores, means for withdrawing the receiving means, means for releasing the clamping means, means for ejecting the core from the stripped casing, and a timing means relating all of said elements to function in proper sequence.

10. A machine for removing cores from tire casings including, in combination, a power-driven shaft, a plurality of eccentrics thereon, an elevator arranged to be raised and lowered by one of the eccentrics, a yoke arranged to be raised and lowered by others of the eccentrics, a rack movable with the yoke, timing-means comprising a timing-plate movable by the rack, casing supports operable by the yoke, core-clamping means operated by the timing means, casing freeing and stripping devices operable by the timing means, means for laterally swinging the core-stripping devices, means for ejecting the core from the stripped casing, and means for discharging the separated casing and core from the machine.

11. In a machine for removing core from tire-casings, the combination of automatic means for stripping a casing from its core, and an elevator arranged to carry and deliver a casing to the stripping means.

12. A machine for removing cores from tire-casings including, in combination, timing means, means under control of the timing means for clamping the core, means for partially freeing the casing that is carried by the core, said last-named means being also under control of the timing means, a pair of strippers under control of the timing means and adapted to move to active positions, and means for actuating the strippers while in active positions to free the casing from the core.

13. A machine for removing cores from tire-casings including, in combination, core and casing suspending and clamping means, means for moving the suspending and clamping means to active and inactive positions, means for partially freeing the casing from the core while suspended and clamped by said means, a pair of swinging tools for further stripping the casing from the core, a pressure device for ejecting the core from the freed casing, and a timing device for controlling the operation of said suspending and clamping means, stripping means, and ejecting means.

14. A machine for removing cores from tire casings including, in combination, core and casing suspending and clamping means, means for moving the suspending and clamping means to active and inactive positions, means for partially freeing the casing from the core while suspended and clamped by said means, a pair of swinging tools for further stripping the casing from the core, a pressure device for ejecting the core from the freed casing, a timing device for controlling the operation of said suspending and clamping means, stripping means, and ejecting means, and means for delivering the core and casing to said suspending and clamping means.

15. A machine for removing cores from tire-casings including, in combination, means for engaging and holding a casing and its core, means for partially freeing the casing from the core, separate means for completely stripping the casing from the core, means for effecting the discharge of the casing and the core after the same have been separated, means for actuating the holding and stripping means, and means for causing said holding and stripping means to operate in proper time relation to each other.

16. A machine for removing cores from tire-casings including, in combination, means for engaging and holding a casing and its core, means for partially freeing the casing from the core, separate means for completely stripping the casing from the core, means for effecting the discharge of the casing and the core after the same have been separated, means for actuating the holding and stripping means, means for causing said holding and stripping means to operate in proper time relation to each other, and means for delivering a casing and its core to the engaging and holding means.

17. A machine for removing cores from tire-casings including, in combination, means for engaging and holding a casing and its core, tools for engaging the edge of the casing to partially free it from the core, and separate means for engaging the casing for further stripping the same from the core.

18. A machine for removing cores from tire-casings including, in combination, means for engaging and holding a casing and its core, tools for engaging the edge of the casing to partially free it from the core, separate means for engaging the casing for further stripping the same from the core, and means for causing said stripping means to operate in proper sequence and in proper time relation to each other.

19. A machine for removing cores from tire-casings including, in combination, means for holding a core with a casing thereon, means comprising a tool for partially freeing the casing from the core, and means comprising a pair of oppositely swingable tools for further stripping the casing from the core.

20. A machine for removing cores from tire-casings including, in combination, means for holding a core with a casing thereon, means comprising a tool for partially freeing the casing from the core, means comprising a pair of oppositely swingable tools for further stripping the casing from the core, and means for automatically actuating said tools in proper sequence.

In testimony whereof I have signed my name to this specification.

NICHOLA YOSIFF MOMITSA.